Aug. 20, 1940.   V. F. LUCHT   2,211,788
GEARING
Filed Aug. 10, 1939

Inventor
Victor F. Lucht
By: *[signature]*
Attorneys

Patented Aug. 20, 1940

2,211,788

UNITED STATES PATENT OFFICE 2,211,788

GEARING

Victor F. Lucht, Silver Spring, Md.

Application August 10, 1939, Serial No. 289,438

8 Claims. (Cl. 192—8)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to gearing and is an improvement upon the gearing disclosed in U. S. Patent No. 2,085,032 to your applicant and Elmer C. Goebert.

An object of the present invention is to so arrange gearing utilizing a worm of the non-locking type that the worm may automatically be restrained against rotation by cooperating brake means carried by the worm and a worm housing operable through the gearing by the load imposed thereon, when the worm ceases to be driven.

A further object of the invention is to effect actuation of the braking means through the gearing in such manner that a more efficient pitch angle may be employed in the worm to increase the overall efficiency of the gearing.

The specific nature of the invention as well as other objects and advantages thereof will clearly appear from a description of a preferred embodiment as shown in the accompanying drawing in which.

Figure 1:
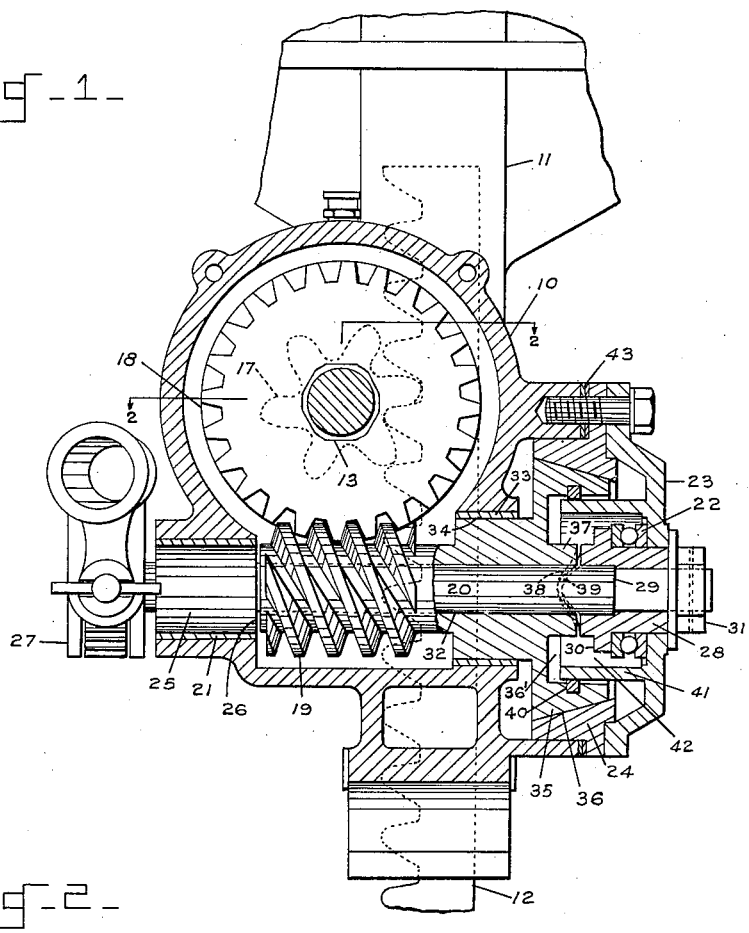
Fig. 1 is an elevational view partially in section showing the gearing of this invention.
Figure 2:
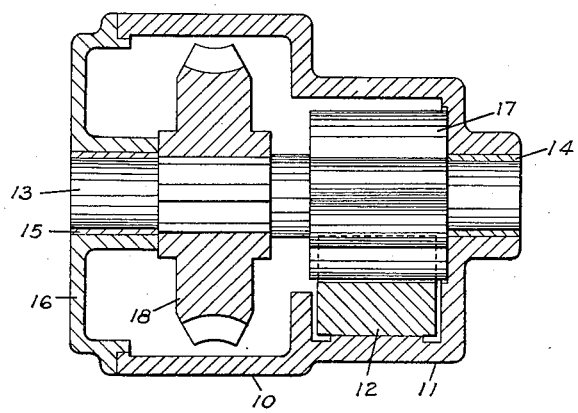
Fig. 2 is a section taken on the line 2—2 of Fig. 1.

Referring now to the drawing by characters of reference there is shown in Fig. 1 a vertically movable housing and carriage 10 adapted to carry a load and having integral therewith or otherwise suitably secured thereto a vertically elongated hollow guide member 11 of any desirable interior configuration. A rack 12 having an exterior configuration so related to the interior configuration of the hollow guide member 11 as to permit sliding movement of the latter thereon is inserted through the hollow guide member and may be suitably anchored at either of its free ends to any convenient support.

Extending across the upper part of the housing is disposed a horizontal shaft 13 freely rotatably journaled in the bearings 14 and 15 and to facilitate access to the shaft 13 the housing portion 16 carrying the bearing 15 may be made removable. Affixed to the shaft 13 is a pinion 17 disposed in meshing relation with the rack 12 whereupon rotation of the shaft will effect sliding movement of the housing 10 with respect to the rack 12. There is also affixed to the shaft 13 a worm wheel 18 disposed in meshing relation with a worm 19 hereinafter described in greater detail.

A horizontally disposed shaft 20 traverses the lower part of the housing 10 at right angles to the shaft 13 and is journaled in the opposed bearings 21 and 22. The housing portion 23 carrying the thrust bearing 22 is preferably made removable and also serves to retain a flanged brake drum 24 in proper position in the housing as shown more clearly in Fig. 1. The shaft 20 is formed to provide an enlarged bearing surface 25 where it engages with bearing 21 and is reduced in cross-section on either side of its surface 25 to its normal cross-sectional area forming a shoulder or abutment as indicated at 26 for a purpose later described. The portion of shaft 20 extending from the enlarged bearing surface 25 remote from shoulder 26 is extended without the housing 10 and has affixed thereon a suitable ratchet mechanism 27 adapted to effect step by step rotation of the shaft upon actuation thereof. At its end remote from the enlarged bearing surface 25 the shaft 20 is formed to provide a cross-section of polygonal shape and has a combined bearing and cam member 28 bored to fit thereover sleeved thereon and journaled in the thrust bearing 22. Conveniently the polygonal shaped end of shaft 20 is of reduced cross-section to form a shoulder 29 that cooperates with a similar shoulder in the bore of the cam member 28 and the latter member is flanged at 30 to engage the thrust member in order that the single fastening means 31 secured to the shaft 20 in engagement with the housing portion 23 may be employed to restrain the shaft against longitudinal movement in either direction.

The worm 19 is longitudinally bored at 32 to be sleeved over the shaft 20 in bearing relation and is arranged to have slight axial sliding movement on the shaft between the abutment 26 and cam member 28. As shown at 33 the housing 10 is formed to provide a bearing intermediate the bearings 21 and 22 in axial alignment therewith and the worm has a bearing surface 34 substantially the same in diameter as the outside diameter of the worm journaled in the bearing 33. A brake shoe 35 having a truncated conical surface 36 adapted to engage the cooperating surface of the brake drum 24 is mounted on the shaft 20 between the bearings 23 and 33 and may conveniently be made integral with the worm, however, as will be readily understood the brake shoe 35 may be made separate from the worm and secured thereto in any suitable manner. The brake shoe is provided with an outwardly directed annular recess 36' forming an annular hub 37 provided with a cam surface 38 complementary to the cam surface 39 on the cam member 28. In order to provide for lubrication of the thrust bearing 23 and cam surfaces 38 and 39 while at the same time keeping the braking surfaces of the brake members as dry of lubricant as possible an annular gasket 40 is inserted in the outer defining wall of recess 36' and a tubular member 41 is made integral with or otherwise secured in sealed relation to the housing portion 23 and extended inwardly in outer circumferential engaging relation with the gasket 40 to form a lubricant reservoir 42 which may be packed with grease or other suitable lubricant at the time the housing portion 23 is assembled on the housing 10.

As shown in Fig. 1 shims 43 are initially inserted between the housing 10 and flange of the brake drum 24 and the conical braking surface of the drum and shoe so regulated with regard to the normal clearance of the cam surfaces 38 and 39 that the conical braking surfaces will frictionally engage under the thrust of the worm and associated gears in the separated position of the cam surfaces to lock the worm against movement under the imposed load thereon. After the conical braking surfaces of the shoe 35 and brake drum 24 have worn sufficiently to take up the clearance between the cam surfaces 38 and 39 the shims 43 may be removed from their position between the housing 10 and flange of the brake drum 24 and inserted between the flange of drum 24 and housing portion 23 thereby displacing the brake drum 24 inwardly and restoring the initial relation between the braking surfaces and clearance of the cams.

Likewise in the case of the instant organization, as in the case of that of the patent referred to, the cam surfaces 38 and 39 are each comprised of right and left helix angles of greater magnitude than the angle of repose between the surfaces so that movement of one cam will effect relative movement of the other.

In operation the parts will occupy a normal position of rest as shown in Fig. 1 with the load imposed upon the housing and carriage 10 being transmitted by the rack 12 and pinion 17 to shaft 13 and worm wheel 18. In the illustration disclosed the imposed load will tend to rotate the worm wheel 18 in a counterclockwise direction as viewed in Fig. 1 and the resulting thrust on worm 19 will tend to displace the worm to the right as viewed in said Fig. 1 in which position the conical surface of the brake shoe 35 will frictionally engage the conical surface of brake drum 24 to prevent rotation of the worm. It is obvious of course that if cam surface 39 is in such position with respect to cam surface 38 as to tend to resist displacement of the worm to the right as viewed in Fig. 1 that the cam surface 38 will rotate the shaft 20 through cam surface 39 to a position where the cam surfaces have sufficient clearance to permit the necessary frictional engagement of the braking surfaces for preventing the rotation of the worm. When it is desired to move the carriage with respect to the rack the ratchet 27 will be set in accordance with the direction of movement desired and step by step rotation of shaft 20 may be effected thereby. Initial movement of the shaft 20 in either clockwise or counterclockwise direction will through the cam surfaces 38 and 39 displace the worm 19 to the left as, viewed in Fig. 1, into abutment with the shoulder 26 on the shaft 20 to disengage the brake surfaces and thereafter rotation of the worm 19 will be accomplished because of its locked relation on the shaft 20 between abutment 26 and cam surface 39 fixed to shaft 20. Rotation of worm 19 will be accompanied by corresponding rotation of the worm wheel 18, shaft 13, and pinion 17 and relative movement of the pinion 17 on the fixed rack 17 will result in sliding movement of the housing 10 on the rack.

Having now described and illustrated what constitutes a practical embodiment of my invention, I do not wish to limit myself strictly to the exact details herein illustrated, since modifications of the same may be made without departing from the spirit of the invention, as defined in the appended claims.

I claim as my invention:

1. In gearing of the type described in combination, an upright rack, a housing slidably mounted on the rack, a shaft having an enlarged bearing forming an abutment thereon journaled in said housing on said bearing, a bearing formed in said housing in spaced axial alignment with the journal of said shaft, an axially bored worm slidably sleeved on said shaft between the abutment thereon and said second named bearing and having a bearing surface journaled in the latter bearing, a brake drum mounted in said housing, a brake shoe secured to said worm and adapted to frictionally engage the brake drum upon axial movement of the worm in a direction away from said abutment, means including said shaft for axially displacing the worm to effect separation of the brake shoe and drum and means interconnecting the worm and rack normally imposing a thrust on the worm in a direction away from said abutment effective to operably engage the brake shoe and brake drum.

2. In gearing of the type described in combination, an upright rack, a housing slidably mounted on the rack, a shaft having an enlarged bearing forming an abutment thereon adjacent one end journaled in said housing on said bearing, a bearing formed in said housing in spaced axial alignment with the journal of said shaft intermediate the ends of the shaft, an axially bored worm slidably sleeved on said shaft between the abutment thereon and said second named bearing and having a bearing surface journaled in the latter bearing, a brake shoe mounted on the end of the shaft protruding from said second named bearing and secured to said worm, a brake drum removably mounted in the housing and adapted to be frictionally engaged by said brake shoe upon axial movement of the worm away from said abutment, a removable housing portion securing the brake drum in its normal position, a thrust bearing carried by said removable housing portion, a thrust bearing member fixed on the adjacent end of the shaft engaging said thrust bearing, means for rotating said shaft, means for axially displacing the worm to effect separation of the brake shoe and brake drum upon rotation of the shaft including said thrust bearing member and means interconnecting the worm and rack normally imposing a thrust on the worm to axially displace the brake shoe into operable engagement with the brake drum.

3. The structure of claim 2 wherein said brake drum comprises an annular member having an interiorly disposed truncated conical braking surface, the brake shoe has a cooperating truncated conical brake surface and is formed with an outwardly opening recess to provide a hub facing said thrust bearing member, and cooperating cam surfaces are formed on the adjacent ends of said hub and bearing thrust member to effect axial displacement of the worm into abutting relation with said abutment upon rotation of the shaft and locking the worm to the shaft during continued rotation of the latter.

4. The structure of claim 2 wherein the brake shoe is formed to provide an outwardly opening annular recess, an annular element is secured in sealed relation to said removable housing portion surrounding said thrust bearing and extended inwardly into said recess, and an endless gasket is interposed between the circumferential outer defining wall of the recess and outer surface of said annular element to form a lubricant reservoir enclosing the thrust bearing and thrust bearing member.

5. The structure of claim 2 wherein said brake drum comprises an outwardly flanged annular member with its flange interposed between the housing and said removable housing portion, and shims initially interposed between the housing and flange and adapted to be subsequently interposed between the flange and housing portion to compensate for wear of the braking surface of the brake drum.

6. In gearing of the type described in combination, an upright rack, a housing slidably mounted on the rack, a pair of opposed bearings in the housing, a shaft provided with an abutment adjacent one end extending between and journaled in said bearings, a third bearing in said housing disposed intermediate the opposed bearings in axial alignment therewith, a worm having a conical braking element on one end journaled in said third bearing and slidably mounted on said shaft with its end remote from said braking element adjacent said abutment, brake means mounted in the housing adapted to cooperate with the conical braking element to prevent rotation of the worm, cooperating means on the shaft and worm for rotating and slidably displacing the worm into contact with said abutment to effect disengagement of the conical braking element from said brak means, and means in said housing for transmitting motion of the worm to the housing comprising a pinion in meshing relation with the rack and a worm wheel for driving the pinion disposed in driven relation with the worm.

7. In gearing of the type described in combination, a rack, a housing mounted on the rack for relative sliding movement, a shaft, a worm mounted on the shaft for relative slidable and rotary movement, an abutment on said shaft engageable with the worm and adapted to transmit thrust of the worm to the shaft, means on said shaft and worm assembly cooperating with said abutment means to limit relative sliding and rotary movement of the shaft and worm, means mounting the shaft and worm assembly in the housing for rotation, cooperating brake elements mounted on the housing and worm, respectively, engageable in a non-engaging relation of said abutment and worm to prevent rotation of the worm, means for rotating the worm including said shaft and first recited means, and means interconnecting the worm and rack adapted to thrust the worm in a direction effective to engage said braking elements.

8. In gearing of the class described in combination, a rack, a housing mounted on the rack for relative sliding movement, a worm, means mounting the worm in the housing for relative rotary and sliding movement, cooperating brake elements on the worm and housing adapted to engage in braking relation when the worm is under a thrust in one direction, gearing interconnecting the worm and rack adapted to impart a thrust to the worm in said one direction, and movable means adapted upon initial movement to slide said worm in a direction to disengage the brake elements and after said initial movement rotate the worm and gearing interconnected therewith.

VICTOR F. LUCHT.